Figure 2:
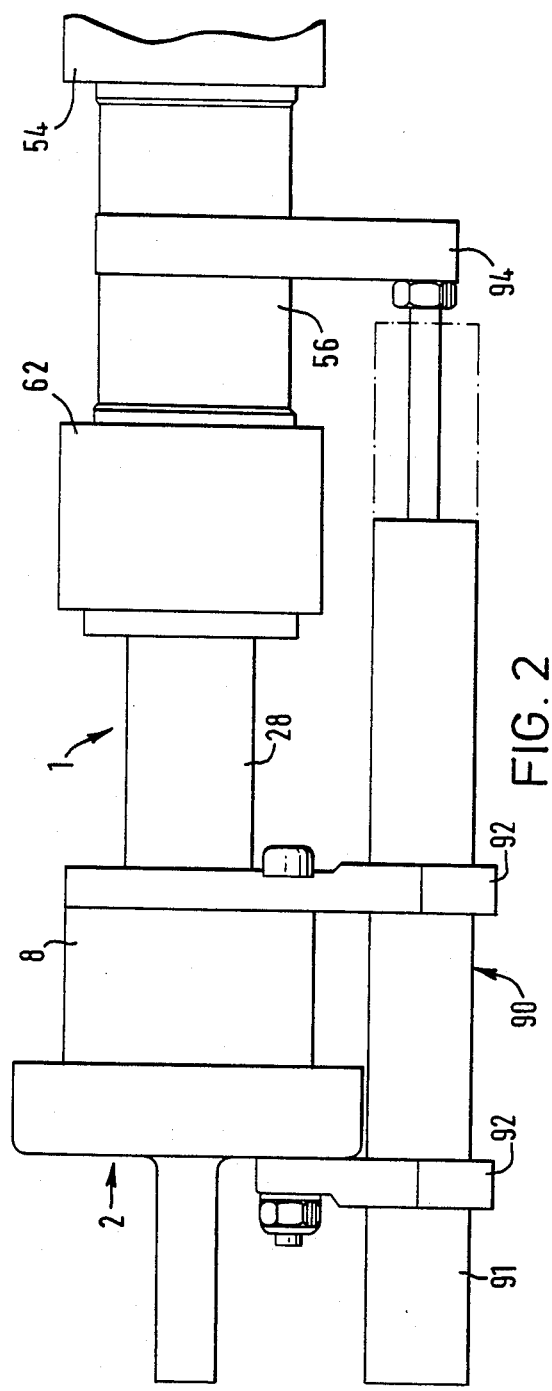

United States Patent [19]

Williams et al.

[11] Patent Number: 4,830,398

[45] Date of Patent: May 16, 1989

[54] VEHICLE SUSPENSION ARRANGEMENTS

[75] Inventors: David A. Williams, Bedford; Peter G. Wright, Norwich, both of England

[73] Assignee: Group Lotus Public Limited Company, Norwich, England

[21] Appl. No.: 747,130

[22] PCT Filed: Oct. 23, 1984

[86] PCT No.: PCT/GB84/00358

§ 371 Date: Jun. 4, 1985

§ 102(e) Date: Jun. 4, 1985

[87] PCT Pub. No.: WO85/01919

PCT Pub. Date: May 9, 1985

[30] Foreign Application Priority Data

Oct. 24, 1983 [GB] United Kingdom ............... 8328373

[51] Int. Cl.⁴ .................... B60G 11/26; B60G 17/00
[52] U.S. Cl. ........................ 280/707; 267/64.26
[58] Field of Search ........... 280/707, 702, 708, 709, 280/711, 714, DIG. 1; 267/64.15, 64.25, 64.26, 64.16

[56] References Cited

U.S. PATENT DOCUMENTS

| 3,011,777 | 12/1961 | Stout | 267/64.26 |
|---|---|---|---|
| 3,141,659 | 7/1964 | Lyon | 280/709 |
| 3,290,038 | 12/1966 | Tollar | 267/64.26 |
| 3,871,678 | 3/1975 | Taft | 280/708 |
| 4,273,303 | 6/1981 | Somm | 244/104 FP |
| 4,286,802 | 9/1981 | Roche | 280/708 |
| 4,368,900 | 1/1983 | Beusse | 280/707 |
| 4,469,315 | 9/1984 | Nicholls | 280/707 |
| 4,506,869 | 3/1985 | Masclet | 267/64.15 |
| 4,506,909 | 3/1985 | Nakashima | 267/64.15 |

FOREIGN PATENT DOCUMENTS

| 114757 | 8/1984 | European Pat. Off. | 280/708 |
|---|---|---|---|
| 3004307 | 8/1981 | Fed. Rep. of Germany | 280/708 |
| 429567 | 9/1911 | France | 280/702 |
| 2401037 | 3/1979 | France . | |
| 572395 | 6/1956 | Italy | 280/709 |

Primary Examiner—Charles A. Marmor
Assistant Examiner—Everett G. Diederiks, Jr.
Attorney, Agent, or Firm—Young & Thompson

[57] ABSTRACT

A vehicle wheel suspension system includes a suspension device having a double acting hydraulic actuator, of which the piston position is adjustable in response to forces acting on the piston and/or to a selective control input, and a load bearing strut operable in response to the actuator piston experience to minimize the actuator load. The device comprises an inner member having a portion slidable within an outer member with the piston on the inner member and slidably engaging the outer member and a fluid body operative between the members, the volume of which is selectively adjustable to alter and strut pre-load and load deflection characteristics. The fluid body may be a body of oil or a gas.

12 Claims, 3 Drawing Sheets

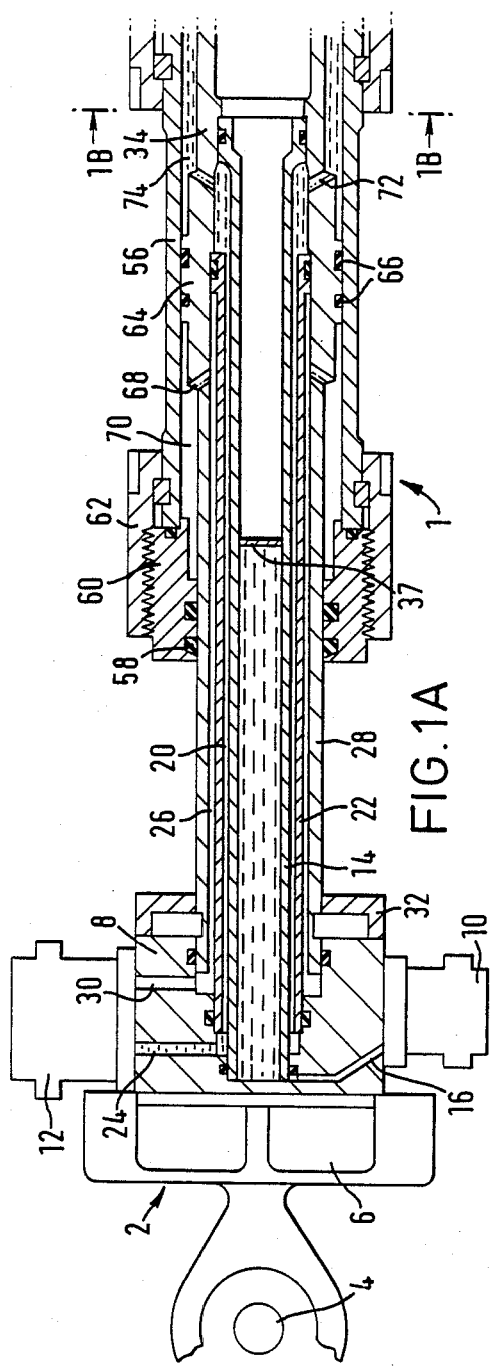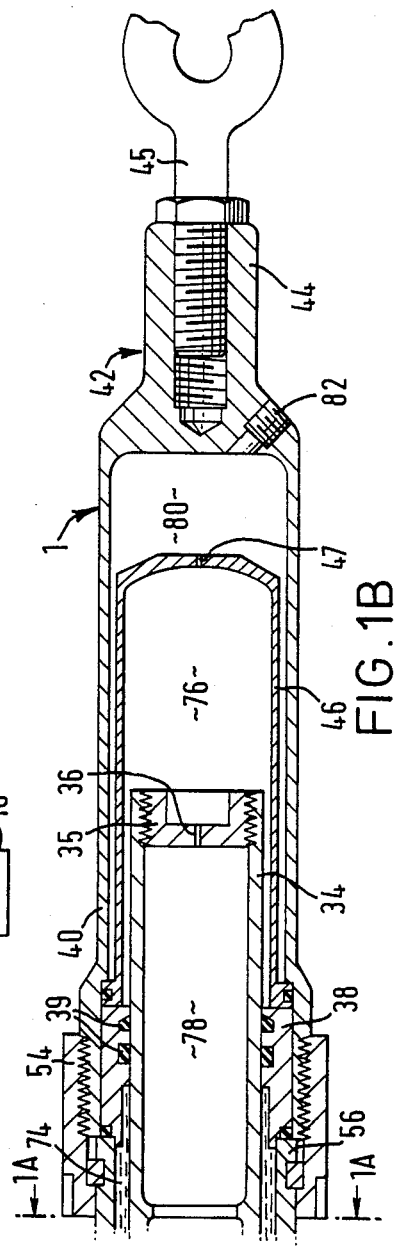

VEHICLE SUSPENSION ARRANGEMENTS

DESCRIPTION

The invention relates to vehicle suspension arrangements.

In U.S. Pat. No. 4,625,993 and in International Patent Application PCT/GB84/00014, both of which claim priority from UK Patent Application No. 83 01 741, there is disclosed a vehicle suspension system comprising wheel suspension devices the displacement of which can be varied, and means responsive to the loading of the suspension devices to feed back to the devices electric signals effecting a predetermined displacement.

Such a vehicle suspension system permits control of the ride of the vehicle and its attitude to be achieved substantially independently. The system can be rendered capable of keeping the vehicle substantially stable in all planes of movement, irrespective of external forces.

The present invention is concerned with the provisions of an improved wheel suspension device for use in such a system or in other systems serving a similar purpose.

The present invention accordingly provides a wheel suspension device comprising an hydraulic actuator of which the piston position is adjustable in response to forces acting thereon and/or to a selected control input, and a load bearing strut responsive to the actuator piston experience to minimise the load carried by the actuator.

The present invention thus also provides a wheel suspension device comprising a double acting hydraulic actuator and a strut of which the pre-load and load deflection characteristics are adjustable, the actuator and the strut being arranged to share the suspension load, and means for adjusting the pre-load and load deflection characteristics of the strut in response to the pressure differential experience by the piston of the hydraulic actuator so as to minimise the share of the suspension load carried by the actuator.

The present invention also provides a vehicle wheel suspension device comprising an inner end member slidable into and out of an outer end member, the members enclosing between them a fluid body of which the volume is selectively adjustable, the inner end member also having a piston portion slidably engaging the outer member interior, the ends of the piston portion being exposed to respective fluid pressures to effect the relative sliding movement of the end members. The fluid body can comprise a body of a suitable hydraulic fluid, but can instead comprise a body of air or other gas of which the volume is adjustable by alteration of the volume of a body of liquid in contact with the body of gas either directly or by way of a free piston, so as to vary the spring rate of the strut.

Typically, the double acting hydraulic actuator is substantially irreversible within a range of load determined by its cross-sectional area and fluid differential supply pressure. Thus, a demand load will effect a displacement, which can remain unaltered in spite of a change in load. The actuator can incorporate sensing means responsive to at least one of piston position, piston velocity and piston acceleration, for supplying signals to electrical control circuitry included in the system in which the suspension device of the invention is incorporated, which circuitry provides outputs controlling the device.

The pre-load and load deflection characteristics of the load bearing strut are conveniently adjustable by variation of the hydraulic fluid quantity present in the strut by way of a servo-valve. The movement of the hydraulic fluid can be employed to damp the movement of the actuator.

Although it is convenient to incorporate the wheel suspension device of the invention to an electric system, when transducers measuring load, pressure, velocity and/or displacement can be included, the device can be controlled mechanically, as by way of a mechanical linkage between the device and the vehicle. Although primarily applicable to road vehicles, the usefulness of the device of the invention is not so limited.

The invention, which can be embodied in a variety of ways, will be understood to provide a wheel suspension device for an active suspension system in which the load on the hydraulic actuator is substantially reduced, if not eliminated, so that a considerable size reduction is possible, together with a reduced power consumption.

Figure 3:
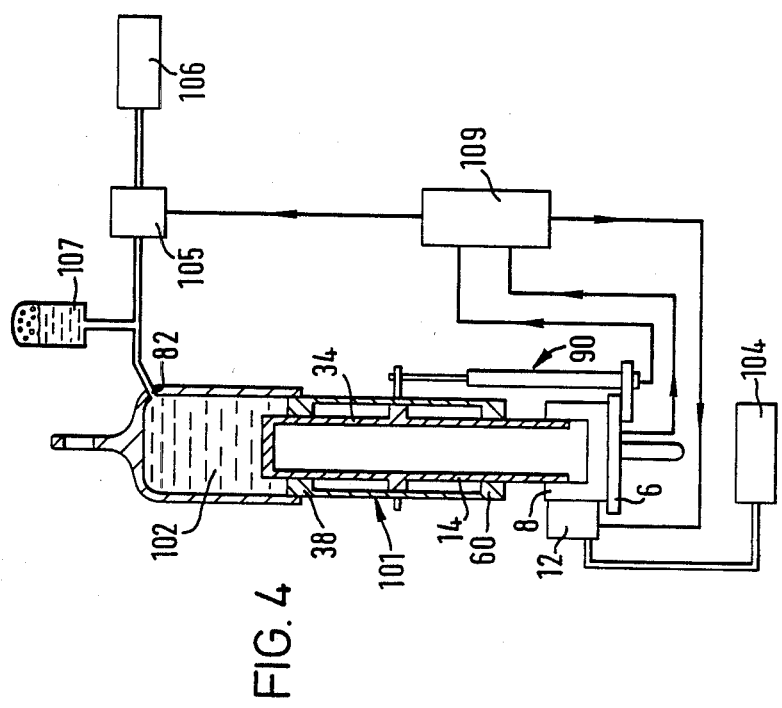
Figure 4:
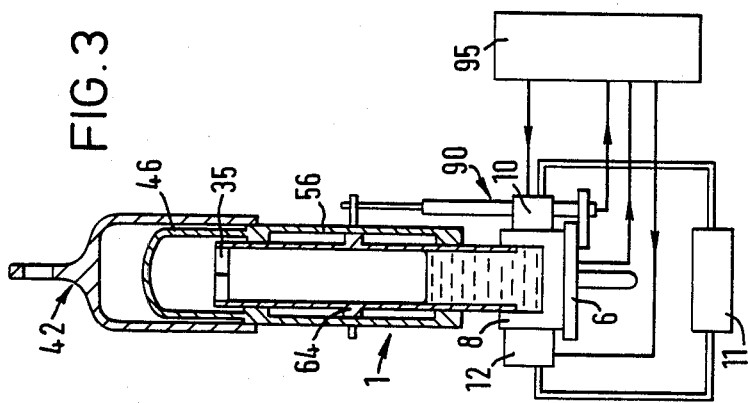

The invention will be more readily understood from the following illustrative description and the accompanying drawings, in which:

FIGS. 1A and 1B together are a sectional front view of a vehicle wheel suspension device embodying the invention, shown in an extended position;

FIG. 2 is a partial side view of the device of FIG. 1;

FIG. 3 schematically shows the suspension device of FIGS. 1 and 2 incorporated in a vehicle wheel suspension system; and FIG. 4 schematically shows a modified form of suspension device in accordance with the invention, incorporated in a second vehicle wheel suspension system.

The vehicle wheel suspension device 1 illustrated in FIGS. 1–3 comprises a lower end fitting 2 formed with a loop 4 for connection of the device to a vehicle axle assembly (not shown).

At its upper side, the fitting 2 has a recess accommodating a load cell 6 operative between the fitting and a headmember 8. The head member 8 mounts two opposed servo valves 10 and 12 and has a stepped recess formed in its upper side within which are received three spaced concentric tubes, each sealed to the head member by an external O-ring or like seal.

The innermost tube 14 communicates through a passage 16 in the head member 8 with the servo-valve 10 for the introduction into the tube interior, and for the withdrawal therefrom, of an oil or other suitable hydraulic fluid from an external source 11. The space 20 between the inner tube 14 and the intermediate tube 22 communicates through a passage 24 in the head member 8 with the servo valve 12, and the outer annular space 26 between the intermediate tube 22 and the stainless steel outer tube 28 communicates with the valve 12 through a passage 30. The assembly comprising the tube 14,22,28 is secured to the head member 8 by means of a steel split collar 32. At its upper end, the inner tube 14 is sealingly secured to an extension portion 34 of the tube 28, of which the upper end is sealed by a plug 35, provided with a pinhole 36.

A ring 38 makes a sliding seal to the exterior of the extension portion 34 by means of sealing rings 39 and is secured to the lower tubular end portion 40 of an upper end fitting 42. The fitting 42 is closed by a reduced diameter portion 44 at its upper end, the portion 44 being tapped to receive a threaded end element 45 for connection of the device to a vehicle chassis.

The end portion 40 surrounds the extension portion 34 with sufficient clearance for the spaced reception therebetween of a sleeve 46 having its lower end sealingly clamped between the ring 36 and a downwardly facing internal step in the end portion 40. The upper end of the sleeve 46 is closed except for a pinhole 47.

An outer ring 54 is secured around the lower end of the end portion 40 by means of a screw threaded connection. Secured within the lower end of the ring 54 is a sleeve 56, the upper end of which abuts the end portion 40 and the ring 38. The sleeve 56 is thus a downward extension of the end fitting 42 and at its lower end it makes a sliding seal on the exterior of the outer tube 28 by means of sealing elements 58 held by an end ring 60 secured to the sleeve end by an outer ring 62.

The outer tube 28 has, below the extension tube 34, a larger diameter portion 64, which makes a sliding seal, with the sleeve 56 by means of sealing elements 66, and which functions as a piston. Ports 68 at the lower end of the portion 64 communicate the space 26, between the tubes 22 and 28, with the space 70 between the tube 28 and the sleeve 56.

Also, ports 72 at the upper end of the portion 64 communicate the space 20 between the tubes 14 and 22 with the space 74 between the extension tube 34 and the sleeve 56.

It will be evident from the foregoing description that the components of the device so far described constitute a double acting hydraulic actuator. Pressure fluid introduced into the space 70 from the source 11, by way of the servo-valve 12, passage 30, annular space 26 and ports 68, will act on the end faces of the space 70 to shorten the device. Pressure fluid supplied to the space 74 through the servo-valve 12, passage 24, annular space 20 and ports 72 will act within the space 74 to lengthen the device. The pressure fluid supply controlled by the servo-valve 12 need not be from the source 11 connected to the servo-valve 10 but can be from a separate source.

The device 1 also incorporates an adjustable load-bearing strut in load-bearing relationship with the hydraulic actuator, the strut being constituted by a gas spring. This functions to accommodate a compression load by compression of air or other gas in a chamber 76 between the tube extension portion 34 and the sleeve 46. The volume 78, comprising the upper part of the interior of the tube 14 above the meniscus of the hydraulic fluid therein, and the interior of the extension portion 34, closed by the plug 35, constitutes a first gas reservoir for the gas spring chamber, with which it communicates through the pinhole 36. The hydraulic fluid can be separated from the volume 78 by a free piston 37. The volume 80, between the sleeve 46 and the portion 40 of the upper end fitting 42 constitutes a second gas reservoir for the gas spring chamber, through the pinhole 47, and this second reservoir can be charged with gas through a charging portion 82 in the end fitting 42.

The condition of the device 1 is sensed not only by the load cell 6 but also by a linear variable displacement transformer 90. The transformer stator portion is received in a housing 91 secured to the fitting 2 and to the head member 8 by connectors 92, the movable core or yoke of the transformer being secured to the sleeve 56 by a connector 94. The transformer output is thus dependent on the length and length variations of the device as represented by the position and movement of the piston portion 64 in the sleeve 56. The transformer 90 thus supplies signals indicative of at least one of the velocity, acceleration and position of the piston portion.

In use of the device 1, the outputs of the load cell 6 and of the linear variable displacement transformer 90 are supplied to control circuitry 95 arranged to generate control signals which are supplied in turn to the servo valves 10 and 12. The control circuitry 95 can be generally of the kind described in U.S. Pat. No. 4,625,993, the disclosure of which is; incorporated herein by reference. The device 1, in its function as a hydraulic actuator, is arranged to be substantially irreversible and its effective length, as well as its velocity and/or acceleration can be governed by control signals fed to the servo-valve 12. Moreover, by means of the control signals supplied to the servo-valve 10, the volume of the hydraulic fluid in the tube 14 can be varied so as to alter the spring characteristics of the device 1 in its function as a load bearing strut.

The modified vehicle wheel suspension device 101 shown schematically in FIG. 4, corresponds to the device 1 of FIGS. 1 and 2, except for internal modifications appropriate to the replacement of the gas volume in spaces 76, 78 and 80 by a body of hydraulic fluid, the volume of which is selectively adjustable to alter the load deflection characteristics of the device. Parts in FIG. 4 corresponding to parts shown in FIGS. 1-3 are indicated by the same reference numerals.

The sleeve 46 is omitted in the suspension device 101 and the plug 35 is either omitted, or replaced by a plug without the pin hole 36, so as to seal off the interior of the tube 14 from the interior of the end fitting 42, which forms a working chamber 102 to which hydraulic fluid is supplied under pressure.

The servo valve 12 again controls the supply of pressure fluid from a source 104 into and out of the passages 24, 30 in the head member 8, but the servo valve 10 is omitted. Instead, a servo valve 105 controls a supply of hydraulic fluid into the working chamber 102 through the port 82 from a second pressure source 106 by way of an hydraulic accumulator 107.

The outputs of the load cell 6 and the linear variable displacement transformer 90 of the suspension device 101 are connected into control circuitry 109, with control outputs supplied to the servo-valves 12 and 105, the function of which generally resembles that of the control circuitry 95.

It will be evident that the invention can be embodied in a variety of ways other than as specifically described.

We claim:

1. A vehicle wheel suspension system comprising a wheel suspension device between the vehicle body and each vehicle wheel, and control means for controlling suspension devices, wherein:
   each suspension device comprises:
   an inner sleeve member having an end connectable to one of said vehicle wheel and said vehicle body, an outer sleeve member having said inner member slidably received therein and having an end connectable to the other of said vehicle wheel and said vehicle body,
   a working chamber formed between the inner and outer members, a piston carried by said inner member for movement in said working chamber in response to an adjustable fluid pressure difference to which the sides of said piston are exposed, said working chamber and said piston constituting a hydraulic actuator, a load-bearing strut operating in load-sharing relationship with said hydraulic actuator and constituted by a body of fluid between said inner and said outer member, the volume of said fluid body being adjustable, and said control means comprises:

first adjustment means for adjusting said fluid pressure difference to thereby move said piston in said working chamber and second adjustment means for adjusting said volume of said fluid body to thereby adjust said loadbearing strut, means for sensing forces acting on said hydraulic actuator piston, and means responsive to said sensed forces to operate said first and second adjustment means so as to reduce the load carried by said hydraulic actuator.

2. The vehicle wheel suspension device of claim 1 wherein said fluid body comprises a liquid body.

3. The vehicle wheel suspension device of claim 1 wherein said fluid body comprises a body of gas, and a body of liquid of which the volume is selectively adjustable to adjust the volume of said body of gas.

4. The vehicle wheel suspension device of claim 3 wherein said liquid body is disposed in the interior of said inner member, said interior communicating with said gas body through a restricted orifice at the upper end of said inner member within said outer member.

5. The vehicle wheel suspension device of claim 3 further comprising a free piston separating said bodies of gas and liquid.

6. The vehicle wheel suspension device of claim 3 further comprising a gas reservoir, a restricted orifice through which said reservoir communicates with said gas body, and means for charging said reservoir from outside said device.

7. The vehicle wheel suspension device of claim 1 wherein said inner member comprises an end fitting, said first adjustment means comprises a servo-valve carried by said end fitting, and three spaced concentric tubes extend from said end fitting and define passages therebetween through which pressure fluid communicates between said servo-valve and respective ends of said working chamber.

8. The vehicle wheel suspension device of claim 1 wherein said sensing means is responsive to at least one of piston position, piston velocity and piston acceleration.

9. In a vehicle comprising a vehicle body and vehicle wheels supporting said body, a suspension system comprising:

double-acting hydraulic actuators, each of said hydraulic actuators comprising an outer sleeve member, an inner sleeve member slidable within said outer sleeve member, and a piston carried by said inner sleeve member externally thereof in sealing arrangement with said outer sleeve member, means mounting each of said hydraulic actuators in load-bearing relationship between said vehicle body and a respective one of said vehicle wheels, first servo-valves each operable to effect adjustment of the piston position of a respective one of said hydraulic actuators, transducer means each adapted to provide signals dependent on at least one of the position, the velocity, or the acceleration of a respective one of said hydraulic actuator pistons, load-bearing struts, each of said load-bearing struts comprising a fluid body located within said inner sleeve member of a respective one of said hydraulic actuators so as to be in load-bearing relationship between said vehicle body and the associated vehicle wheel, second servo-valves each operable to adjust a respective one of said load-bearing struts, and circuit means adapted to respond to said signals from said transducer means to supply control signals to said first and second servo-valves, said control signals to said second servo-valves being such as to adjust said load-bearing struts so as to reduce the vehicle body load carried by said hydraulic actuators.

10. The vehicle of claim 9 wherein said fluid body comprises a gas body constituting a gas spring and a liquid body of which the volume can be varied by means of said second servo-valve thereby to alter the spring characteristics of said gas body.

11. The vehicle of claim 9 wherein said fluid body comprises a liquid body in communication with said second servo-valve by way of a hydraulic accumulator.

12. The vehicle of claim 9 wherein said transducer means comprises a load cell and a linear variable displacement transformer.

* * * * *